Dec. 29, 1959     H. E. MILLER     2,918,954
DRILL
Original Filed Nov. 12, 1954
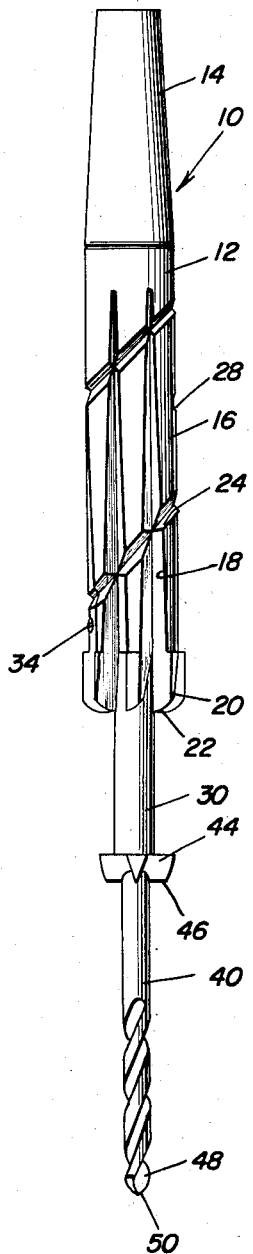
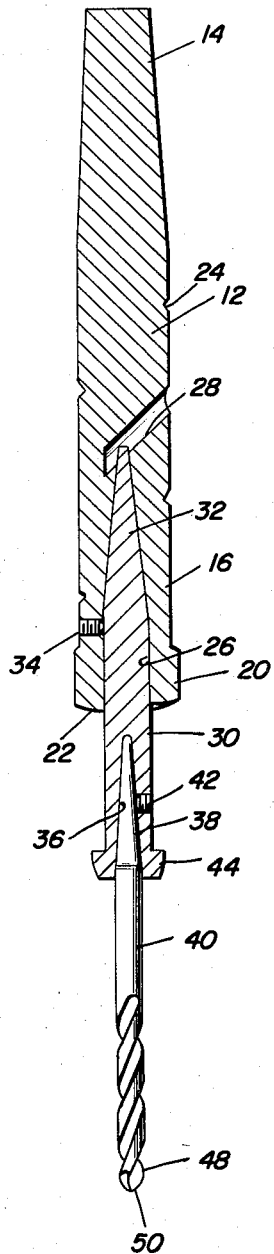
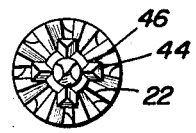
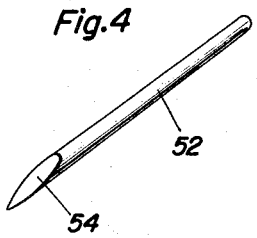
Harry E. Miller
INVENTOR.

United States Patent Office 2,918,954
Patented Dec. 29, 1959

2,918,954

DRILL

Harry E. Miller, Johnstown, Pa.

Original application November 12, 1954, Serial No. 468,339, now Patent No. 2,842,015, dated July 8, 1958. Divided and this application May 27, 1958, Serial No. 738,184

3 Claims. (Cl. 145—125)

This invention generally relates to a drill and more particularly forms a division of copending application Serial No. 468,339, filed November 12, 1954 for Drill and now Patent No. 2,842,015 issued July 8, 1958.

An object of this invention is to provide a drill having a shank together with cutting means at one end thereof and a pilot or guide drill of smaller dimensions than the cutting means for boring a preliminary aperture and forming a pilot or guide for the cutting means.

Another object of the present invention is to provide a drill having a novel cutting means in which the material that is bored out of the article in which the hole is being bored is removed from the area of boring thereby reducing the friction and heat and generally effecting an efficient operation.

A further object of the present invention is to provide a drill having a tapered bore in the lower end thereof for receiving the tapered end of a guide drill or pilot drill thereby securing the pilot drill to the main drill shaft.

A further important object of the present invention is to provide a drill that is simple in construction, easy to use, versatile in utility, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of the drill of the present invention;

Figure 2 is a longitudinal, vertical sectional view taken substantially upon the plane passing along section line disposed on the longitudinal axis of the device;

Figure 3 is an end view of the working end of the drill; and

Figure 4 is a perspective view of a tool used in dislodging the pilot drill from the main drill.

Referring now specifically to Figures 1–3, the numeral 10 generally designates the drill of the present invention which includes a generally elongated shank 12 having a tapered portion 14 for engagement in a suitable chuck and also including a plurality of longitudinally elongated flutes 16 formed by a plurality of longitudinal grooves 18. The lower end of the flutes 16 are enlarged as indicated by the numeral 20 and are pointed and sharpened at the lower ends 22. A groove 24 is provided in the peripheral surface of the shank 12 for removing and urging the material that has been bored upwardly to an out-of-the-way position. The lower end of the shank 12 is provided with an axial bore 26 having a tapered upper end portion in communication with an inwardly and downwardly extending bore 28 providing access to the upper end of an intermediate member 30 that is provided with a tapered upper end portion 32 for engagement in the bore 26. A suitable setscrew 34 is provided for securely locking the intermediate member 30 within the bore 26. In the lower end of the intermediate member 30 is a tapered bore 36 having the tapered upper end 38 of a drill bit 40 therein with a suitable setscrew 42 being provided for locking the drill bit therein and also, it will be understood that a suitable bore may be provided for engaging the upper end of the drill bit 40 for dislodging the drill bit 40 from the intermediate member 30. The intermediate member 30 at the lower end thereof is provided with a peripheral flange designated by the numeral 44 and includes a plurality of cutting edges 46. Also, the drill bit 40 is provided with spiral grooves 48 and a sharpened cutting end 50 wherein the drill bit 40 together with the intermediate member 30 and the cutting edges 46 thereon will form a pilot for cutting material such as wood or the like.

Figure 4 illustrates a tool 52 having a flatted and pointed end 54 that is provided for insertion into the bore 28 for engagement with the upper end of the tapered portion 32 of the intermediate member 30 so that the intermediate member 30 as well as the drill bit 40 may be expeditiously dislodged from the tapered bore 26.

In operation, the device will be utilized in drilling apertures through wood regardless of the condition thereof and the particular arrangement of the pilot grill in conjunction with the main cutting member will greatly facilitate the accuracy of the drilling operation and reduce the wear on the bit and the heating up of the bit caused by the condition of the wood. The drill bits as illustrated have been extensively used in drilling holes through various types of wood having various knotty conditions with a minimum of wear, heating up, breakage and time expenditure. The material being cut by the cutting edges 22 will be carried upwardly by the spiral groove construction of and the particular construction of the flutes and grooves provides a highly novel construction which is not only efficient but long lasting and not subject to excessive wear or damage.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A drill comprising an elongated shank, cutting means integral with one end of said shank, and auxiliary cutting means extending axially from the same end of said shank, said auxiliary cutting means including a drill bit, said drill bit having a tapered upper end for engagement in a tapered bore in said shank, said drill bit including a separate intermediate section having a cutter on the end thereof remote from the integral cutting means on the shank, and an aperture communicating with the inner end of the tapered bore for receiving a tool for loosening the drill bit, said shank having a spiral groove thereon for removing material cut by the integral cutting means on the shank, said integral cutting means on the shank including a plurality of longitudinally elongated flutes having sharpened enlarged lower ends for boring through material.

2. A compound drill device comprising an elongated shank adapted to be secured to the rotating spindle of a drill, said shank having an inwardly extending tapered socket in one end thereof, a peripheral flange on said shank at said one end, a plurality of longitudinally disposed tapered flutes on said one end of the shank with the ends of the flutes being enlarged to form the peripheral flange and having their lower edge sharpened for cutting material, a tapered bit assembly disposed in said socket, said tapered bit assembly including an upper section having a tapered upper end detachably received in the socket, and a lower section including a tapered drill bit extending axially from the lower end of the upper section, the tapered upper section having a tapered socket for detachably receiving the upper end of the tapered drill bit thereby connecting the sections.

3. The combination of claim 2 wherein said upper section is provided with a peripheral flange at the lower end thereof and a plurality of radial teeth formed therein with the radial teeth having an axially facing cutting edge.

References Cited in the file of this patent

UNITED STATES PATENTS

| | | |
|---|---|---|
| 267,590 | Revenaugh | Nov. 14, 1882 |
| 362,934 | Champion | May 17, 1887 |
| 421,218 | Wood | Feb. 11, 1890 |
| 835,125 | Webb | Nov. 6, 1906 |
| 1,474,049 | McCurdy | Nov. 13, 1923 |
| 2,832,386 | Van Dalen | Apr. 29, 1958 |